Patented July 3, 1951

2,558,875

UNITED STATES PATENT OFFICE 2,558,875

FLUORINE SUBSTITUTED AMINES

Frank G. Pearson, Bryn Mawr, Pa., assignor to American Viscose Corporation, Wilmington, Del., a corporation of Delaware No Drawing. Application March 24, 1947, Serial No. 736,631

5 Claims. (Cl. 260—563)

This invention relates to amine adducts of fluorinated butynes.

I have found that when primary or secondary aliphatic or aromatic amines are reacted with butynes of the type

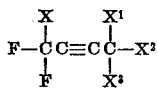

where X, X$^1$, X$^2$, and X$^3$ are hydrogen, chlorine or fluorine, adducts are formed, via direct addition of the amino compound to the triple bond of the butyne. Surprisingly, the addition of the amino compound takes place spontaneously, in the absence of a catalyst, under ordinary temperature conditions, and at comparatively low pressures. The addition products may be represented by the general formula

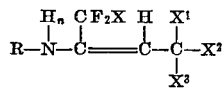

where

is derived from a substance selected from the group consisting of aliphatic, alicyclic, and aromatic primary and secondary amines, $n$ is an integer selected from the group consisting of zero and one, and X, X$^1$, X$^2$, and X$^3$ are selected from the group consisting of hydrogen, chlorine, and fluorine.

The adducts are colorless liquids which are useful as chemical reagents in various chemical processes, and as solvents and diluents for various coating and other compositions.

Among the primary and secondary amines which may be added to the triple bond of the fluorinated butyne may be mentioned aliphatic amines of the type of methylamine, ethylamine, propylamine, isopropylamine, dimethylamine, diethylamine, etc., alicyclic amines of the type of cyclohexylamine and morpholine; aromatic amines of the type of aniline, the toluidines, the xylidines, monomethyl aniline, pyrrol, pyrazole, piperidine, etc. Of the primary and secondary amines mentioned, those having a comparatively low molecular weight, that is a molecular weight in the range of from about 31 to about 200 represent a preferred class of compounds for reaction with the fluorinated butynes in accordance with this invention.

Hexafluorobutyne can be prepared by the dechlorination of the compound CF$_3$CCl=CClCF$_3$ as described in J. A. C. S., vol. 71, p. 298, 1949; J. A. C. S., vol. 69, p. 1820, 1947.

Example

A three-necked round-bottom flask was equipped with a sealed stirrer, thermometer, gas inlet leading to a cylinder of hexafluorobutyne, and connection to an open end mercury monometer. Five hundred parts of anhydrous ether and 49.6 parts of cyclohexylamine were placed in the flask. The flask was surrounded with a cooling mixture, stirring was started, and vacuum was applied until the air pressure in the flask was considerably reduced. Hexafluorobutyne was allowed to flow into the reaction vessel at a rate such that the temperature did not exceed 20° C. and the internal pressure did not exceed atmospheric pressure. When absorption of the gas had ceased, the contents of the reaction vessel was removed and placed in a distillation apparatus. The ether was distilled off, after which 80.2 parts of a product corresponding to the formula:

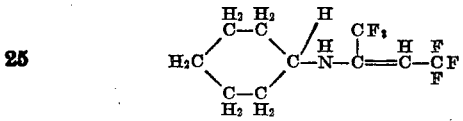

N-(1-trifluoromethyl-3,3,3-trifluoropropenyl)-cyclohexylamine, was recovered at 65–66° C. (10 mm.), N$_D^{25°}$=1.3874, $d^{25°}$=1.2461 g./cc. The product was stable to water, but decolorized bromine in carbon tetrachloride.

Anal.: Calc'd for C$_{10}$H$_{13}$NF$_6$:N$_c$, 5.36%; C, 45.94%; H, 5.02%. Found: N, 5.20%, 5.36%; C, 46.67, 46.37; H, 5.15, 5.17.

Instead of the hexafluorobutyne specifically illustrated, other butynes having at least two fluorine atoms attached to a single carbon may be reacted with the alicyclic amine, such as 1,1-difluorobutyne, 1,1-difluoro-4,4-difluorobutyne, 1,1-difluoro-4,4-dichlorobutyne, 1,1,1-trifluorobutyne, 1,1,1-trifluoro-4,4-dichlorobutyne, 1,1,1-trifluoro-4-monochlorobutyne, and 1,1,1-trifluoro-1,1,1-trichlorobutyne.

Variations and modifications may be made in carrying out the reactions specifically exemplified herein without departing from the spirit and scope of the invention as defined in the appended claims.

I claim:

1. A process comprising the steps of reacting hexafluorobutyne with an amine selected from the group consisting of cyclohexylamine and primary and secondary lower alkyl amines in the absence of a catalyst, at room temperature and under atmospheric pressure, and distilling the reaction product.

2. A process comprising the steps of reacting hexafluorobutyne with a lower primary alkyl amine in the absence of a catalyst, at room temperature and under atmospheric pressure, and distilling the reaction product.

3. A process comprising the steps of reacting hexafluorobutyne with a lower secondary alkyl amine in the absence of a catalyst, at room temperature and under atmospheric pressure, and distilling the reaction product.

4. Process which comprises the steps of reacting hexafluorobutyne with cyclohexylamine in the absence of a catalyst, at room temperature, and under atmospheric pressure, and distilling the reaction product to recover N-(1-trifluoromethyl-3,3,3-trifluoropropenyl)-cyclohexylamine.

5. N - (1 - trifluoromethyl - 3,3,3 - trifluoropropenyl) - cyclohexylamine.

FRANK G. PEARSON.

REFERENCES CITED

The following references are of record in the file of this patent:

FOREIGN PATENTS

| Number | Country | Date |
|---|---|---|
| 510,457 | Great Britain | Aug. 2, 1939 |

OTHER REFERENCES

McBee: Ind. Eng. Chem., vol. 39, pp. 236-237 (1947).

Simons: Ind. Eng. Chem., vol. 39, pp. 238-241 (1947).